United States Patent
Muramatsu et al.

(10) Patent No.: US 7,453,542 B2
(45) Date of Patent: Nov. 18, 2008

(54) DISPLAY DEVICE HAVING FIRST AND SECOND OFFSETTING TRANSFER-CONNECTIONS CONNECTED BETWEEN DRIVING ELECTRODES AND WIRING LINES AND BENT RESPECTIVELY IN DIFFERENT DIRECTIONS TO ADJUST WIRING LINE RESISTANCES

(75) Inventors: Kazutoshi Muramatsu, Nishitokyo (JP); Takeru Yoshino, Sayama (JP); Katsuyuki Tanaka, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 657 days.

(21) Appl. No.: 10/935,427

(22) Filed: Sep. 8, 2004

(65) Prior Publication Data

US 2005/0062687 A1 Mar. 24, 2005

(30) Foreign Application Priority Data

Sep. 9, 2003 (JP) ............................. 2003-316317

(51) Int. Cl.
*G02F 1/1345* (2006.01)
(52) U.S. Cl. ...................................... 349/149; 349/152
(58) Field of Classification Search .......... 349/149–152
See application file for complete search history.

(56) References Cited

U.S. PATENT DOCUMENTS 6,104,465 A * 8/2000 Na et al. ..................... 349/152

6,879,367 B2 * 4/2005 Ukita .......................... 349/149
2002/0044242 A1 * 4/2002 Kim ............................ 349/139

FOREIGN PATENT DOCUMENTS

| JP | A-2002-148654 | 5/2002 |
| JP | A-2003-029289 | 1/2003 |
| JP | A-2003-036040 | 2/2003 |
| JP | A-2003-098532 | 4/2003 |

* cited by examiner

*Primary Examiner*—David C. Nelms
*Assistant Examiner*—John Heyman
(74) *Attorney, Agent, or Firm*—Finnegan, Henderson, Farabow, Garrett & Dunner, L.L.P.

(57) ABSTRACT

The present invention is directed to the provision of a display apparatus that can achieve an improvement in display quality by adjusting the wiring resistance ratio of wiring lines. The display apparatus (1, 100) according to the present invention comprises a first substrate (3), a second substrate (3), and a seal member (4), wherein first driving electrodes (11-1 to 11-5) are electrically connected at first transfer-connection positions (T1 to T5) to first wiring lines (14-1 to 14-5) via the seal member, and second driving electrodes are electrically connected at second transfer-connection positions (T6 to T10) to second wiring lines (14-2) via the seal member, the first transfer-connection positions are provided at positions respectively offset in a first direction from the extended lines of the respective first driving electrodes, and the second transfer-connection positions are provided at positions respectively offset from the extended lines of the respective second driving electrodes in a second direction which is different from the first direction.

11 Claims, 11 Drawing Sheets

PRIOR ART

PRIOR ART

PRIOR ART

DISPLAY DEVICE HAVING FIRST AND SECOND OFFSETTING TRANSFER-CONNECTIONS CONNECTED BETWEEN DRIVING ELECTRODES AND WIRING LINES AND BENT RESPECTIVELY IN DIFFERENT DIRECTIONS TO ADJUST WIRING LINE RESISTANCES

FIELD OF THE INVENTION

The present invention relates to a display apparatus that uses a liquid crystal, an EL, or like, material as an electro-optical conversion material and, more particularly, to a display apparatus in which the area outside the display area is reduced to a minimum in order to reduce the overall size of the apparatus.

BACKGROUND OF THE INVENTION

In recent years, liquid crystal display panels, a class of panels that use electro-optical conversion materials, have come into wide use as display means for displaying various kinds of information on portable electronic apparatus such as notebook computers, mobile telephones, and wrist watches. In particular, in a portable electronic apparatus or the like, the liquid crystal panel is accommodated in a limited space inside the apparatus housing. Further, in such a portable electronic apparatus, there is a need to increase the amount of information that can be displayed, and it is therefore desired to provide a construction that maximizes the display area and minimizes the area outside the display area (in this patent specification, such an outside area is hereinafter sometimes referred to as the "non-display area" or the "peripheral portion").

In this type of display apparatus and, in particular, in a display apparatus called the passive matrix (direct matrix) type, a liquid crystal material is sealed between two substrates, and stripe-shaped electrodes intersecting at right angles to each other are formed on the opposing surfaces of the substrates. In this type of display apparatus, pixels are formed at the positions where the electrodes on the two substrates intersect each other, and a method is employed that drives the liquid crystal, on a pixel-by-pixel basis, from the outside. To drive the liquid crystal by using the electrodes disposed opposite each other, it has been practiced to mount a driver IC in the non-display area of each substrate and form, in the same area, wiring lines for electrically connecting the electrodes to the terminals of the driver IC. Accordingly, each substrate protrudes outwardly beyond the other substrate.

This structure, however, has had the problem that the peripheral portion becomes large because an area for mounting the driver IC has to be provided on each substrate. Furthermore, the shape of the liquid crystal display panel becomes asymmetric with either the left or right side or either the upper or lower side greatly extending outward relative to the other side. When mounting such a liquid crystal panel, for example, inside the housing of a portable electronic apparatus, there has arisen the problem that the panel cannot be accommodated unless the outer frame of the housing is made larger. The further problem has been that, since the outer frame of the housing has to be made asymmetric in shape, the liquid crystal display section cannot be placed in the center of the electronic apparatus.

In view of the above situation, a method that drives the liquid crystal by a single driver IC has been proposed for a small-size panel having a moderate number of pixels, such as a panel for a mobile telephone, for such purposes as reducing the peripheral portion area of the liquid crystal display panel, making the peripheral portion shape symmetrical, and reducing the number of driver ICs used (for example, Patent Document 1: Japanese Unexamined Patent Publication No. 2003-98532).

In this driving method, all the electrodes formed on the two substrates are electrically connected to a large number of wiring lines formed on the non-display area of one substrate, and these wiring lines are connected to the single driver IC.

FIG. 13 shows an example in which the liquid crystal panel is driven by a single driver IC as described above. In FIG. 13, the driver IC 7 is mounted on the upper surface of the lower substrate 2, and a large number of stripe-shaped signal electrodes 10 are formed on the same surface. The signal electrodes 10 are connected to the corresponding terminals of the driver IC 7 via a large number of wiring lines 15.

On the other hand, a large number of stripe-shaped driving electrodes 11 are formed on the lower surface of the upper substrate 3 in such a manner as to intersect at right angles with the signal electrodes 10. Of the driving electrodes 11 (10 driving electrodes 11 are shown in FIG. 13), the driving electrodes 11-1 to 11-5 in the upper half of the figure (the upper five electrodes in FIG. 13) are connected at their right ends to transfer-connection positions T1 to T5 where connections are made to a conductive seal member 16b. A portion H encircling the transfer-connection positions T1 to T5 in FIG. 13 is shown in enlarged form in FIG. 14. As shown in FIG. 14, the transfer-connection positions T1 to T5 are located on extended lines Q to which the respective driving electrodes 11-1 to 11-5 are extended in straight lines.

The driving electrodes 11-1 to 11-5 formed on the lower surface of the upper substrate 3 are electrically connected at the respective transfer-connection positions T1 to T5 on the seal member 16b to driving electrode wiring lines 14 formed on the upper surface of the lower substrate 2. These wiring lines 14 are connected to output terminals (not shown) of the driver IC 7 mounted on an extended portion 9 of the lower substrate 2. The conductive seal portion 16b of the seal member 16 is formed from an anisotropic conductive adhesive prepared by mixing electrically conductive particles into an insulating adhesive resin. Accordingly, the driving electrodes 11-1 to 11-5 connected to the conductive seal portion 16b are electrically connected to the respective wiring lines 14 via an inter-substrate conducting portion formed by the electrically conductive particles.

Likewise, the driving electrodes 11-6 to 11-10 in the lower half of FIG. 13 (the lower five electrodes in FIG. 13) are connected at their left ends to transfer-connection positions T6 to T10 where connections are made to a conductive seal member 16a. A portion I encircling the transfer-connection positions T6 to T10 in FIG. 13 is shown in enlarged form in FIG. 15. As shown in FIG. 15, the transfer-connection positions T6 to T10 are located on extended lines Q to which the respective driving electrodes 11-6 to 11-10 are extended in straight lines.

The driving electrodes 11-6 to 11-10 formed on the lower surface of the upper substrate 3 are electrically connected at the respective transfer-connection positions T6 to T10 on the seal member 16a to driving electrode wiring lines 14 formed on the upper surface of the lower substrate 2. These wiring lines 14 are connected to output terminals (not shown) of the driver IC 7 mounted on the extended portion 9 of the lower substrate 2. Here also, the conductive seal portion 16a of the seal member 16 is formed from an anisotropic conductive adhesive prepared by mixing electrically conductive particles into an insulating adhesive resin. Accordingly, the driving electrodes 11-6 to 11-10 connected to the conductive seal portion 16a are electrically connected to the respective wiring lines 14 via an inter-substrate conducting portion formed by the electrically conductive particles.

In this way, the driving electrodes 11 on the upper substrate 3 and the signal electrodes 10 on the lower substrate 2 are all connected to the corresponding terminals of the driver IC 7 mounted on the lower substrate 2, and image signals and operation signals are supplied from this driver IC 7 to all the signal electrodes 10 and driving electrodes 11.

That is, in the example shown in FIG. 13, the wiring lines 14 to the driving electrodes 11 are formed on the lower substrate 2. Further, the driving electrodes 11 are formed so as to be transfer-connected to the wiring lines 14 on the extended lines Q to which the respective driving electrodes 11 are extended in straight lines.

The prior art also proposes a display apparatus that employs a resistance ratio adjusting technique in which the wiring resistance ratio between the wiring lines connecting to the driving electrodes is reduced by routing the wiring lines in such a manner as to return in the reverse direction at one side of the display area, thereby reducing the unevenness of display (a phenomenon in which the display brightness differs between one portion of the display area and the other portion thereof) that can occur when the wiring resistance ratio is large (for example, Patent Document 2: Japanese Unexamined Patent Publication No. 2002-148654).

In the prior art, it is also known to provide a display apparatus that employs a configuration in which the scanning lines formed on the inside surface of the opposite substrate are electrically connected via a seal member to the wiring lines formed on the upper surface of a device substrate, at positions other than the positions on the extended lines to which the scanning lines are extended in straight lines (for example, Patent Document 3: Japanese Unexamined Patent Publication No. 2003-29289).

As described above, the trend in recent display apparatuses is toward increasing the display capacity more than ever. If the display capacity (the number of pixels) of display apparatus increases, the number of wiring lines increases, requiring a larger area for the formation of the wiring lines.

One possible method for preventing the area necessary for the formation of the wiring lines 14 from increasing despite the increase of the display capacity would be to reduce the pitch of the wiring lines 14. For example, in the display apparatus described in Patent Document 1, the line/space (L/S) of the wiring lines 14 is chosen to be about 22/10 μm, and the width of each wiring line 14 is chosen to be about 22 μm.

In the display apparatus described in Patent Document 1, the wiring lines 14 to the driving electrodes 11 are formed on the lower substrate 2, and the driving electrodes 11 are transfer-connected to the wiring lines 14 on the straight extended lines (extended lines Q) of the driving electrodes 11, as earlier described. Furthermore, as the driving electrodes 11 are brought out laterally in straight lines, the routing lengths of the wiring lines 14 increase, increasing the difference in wiring resistance between the wiring lines 14 and causing unevenness and crosstalk in the displayed image, hence the problem of display quality degradation.

FIG. 16 shows the relationship, G, of the normalized wiring resistance Ω (ohm) to the arrangement numbers N (1 to 10 lines) of the driving electrodes 11. The driving electrodes 11-1 to 11-5 in FIG. 13 correspond to the arrangement numbers 1 to 5 in FIG. 16, while the driving electrodes 11-6 to 11-10 correspond to the arrangement numbers 6 to 10 in FIG. 16. In FIG. 13, the driving electrode 11-1 is nearest to the driver IC 7, so that the length of its wiring line 14 is short and the wiring resistance is therefore low. On the other hand, the driving electrode 11-10 in FIG. 13 is farthest from the driver IC 7, so that the length of its wiring line 14 is long and the wiring resistance is therefore high.

Here, of the wiring lines (shown in the upper right of FIG. 13) for the driving electrodes 11-1 to 11-5, the wiring line for the driving electrode 11-1 nearest to the driver IC 7 is formed on the outer side, while the wiring line for the driving electrode 11-5 farthest from the driver IC 7 is formed on the inner side. On the other hand, of the wiring lines (shown in the upper and lower right of FIG. 13) for the driving electrodes 11-6 to 11-10, the wiring line for the driving electrode 11-6 nearest to the driver IC 7 is formed on the outer side, while the wiring line for the driving electrode 11-10 farthest from the driver IC 7 is formed on the inner side. The reason for this arrangement is that any wiring line must be routed without crossing any other wiring line. Accordingly, a large difference occurs in terms of distance between the wiring line for the driving electrode 11-5, which is routed along the inner side, and the wiring line for the driving electrode 11-6, which is routed along the outer side. This difference results in a wiring resistance step between the driving electrode arrangement numbers 5 and 6 in FIG. 16.

With the driving electrode (for example, 11-1) whose wiring resistance is low, a sufficiently high driving voltage is applied to the liquid crystal but, in the case of the driving electrode (for example, 11-10) whose wiring resistance is high, the applied driving voltage drops. Here, if the driving voltage decreases gradually and uniformly from the upper to the lower of FIG. 13, no appreciable problem will occur in the display quality of the display panel as a whole. However, if there is a portion where the wiring resistance changes greatly, as shown in the wiring resistance graph G of FIG. 16, an appreciable difference occurs in terms of display quality before and after that portion. More specifically, in the example of FIG. 13, there has been the problem that the display quality degrades because a border becomes visible between the upper half, where display operation is controlled by the driving electrodes 11-1 to 11-5, and the lower half, where display operation is controlled by the driving electrodes 11-6 to 11-10.

Further, in the display apparatus disclosed in Patent Document 1, the seal member 16 has a dual seal structure consisting of a conductive seal member and an insulating seal member, and the wiring lines are placed under the insulating seal member. Patent Document 1 describes that, with this structure, a compact and thin-peripheral portion panel can be achieved by eliminating the wiring line formation area traditionally provided outside the seal. However, the double seal structure has had the problem that the manufacturing process becomes complex and the cost increases.

Furthermore, in the display apparatus disclosed in Patent Document 1, the wiring lines 14 to the driving electrodes 11 are formed on the lower substrate 2. Further, the ends of the driving electrodes 11 are brought out in a direction orthogonal to the direction of the signal electrodes 10, and the driving electrodes 11 are transfer-connected at their ends to the respective wiring lines 14. There has, therefore, been the problem that the space surrounding the signal electrodes (the space bounding the sides of the signal electrodes) opposite the end portions of the driving electrodes 11 cannot be used at all because the end portions of the driving electrodes 11 are used exclusively for the above purpose.

In the display apparatus disclosed in Patent Document 2, the resistance ratio between the wiring lines is adjusted by routing the wiring lines in such a manner as to return in the reverse direction at one side of the display area. As the wiring lines are routed back and forth, a large area for accommodating the wiring lines has had to be provided in the side portion of the display area; thus, the display apparatus has had the problem that the peripheral portion area, and hence the overall size of the display apparatus, cannot be reduced.

Further, in the display apparatus disclosed in Patent Document 2, since the wiring lines are transferred to the opposite substrate via the side portion of the seal member on the driver IC side, the area of the seal member has had to be increased in order to ensure the electrical conduction area of the transfer portion (i.e., to ensure the reliability of electrical conduction). Accordingly, the ratio of the peripheral portion (non-display) area to the display area becomes large, leading to the problem that the reduction of the display apparatus size cannot be expected and, not only that, otherwise unnecessary substrate, and other, material costs occur in the manufacturing process.

In the display apparatus disclosed in Patent Document 3, the driving electrodes are brought out at one or the other end thereof in alternating fashion, and are transfer-connected to the corresponding wiring lines at positions displaced from the extended lines of the respective driving electrodes. However, as the driving electrodes are brought out for transfer connection at one or the other end thereof in alternating fashion, there has been the problem that the areas at the ends of the driving electrodes cannot be effectively utilized. Furthermore, the display apparatus disclosed in Patent Document 3 has had the problem that the resistance values of the wiring lines cannot be corrected because the positions at which the driving electrodes are transfer-connected to the wiring lines are always displaced in the same direction from the extended lines of the driving electrodes.

SUMMARY OF THE INVENTION

Accordingly an object of the present invention is to provide a display apparatus that can solve the above-enumerated problems.

An another object of the present invention is to provide a display apparatus that achieves an improvement in display quality by adjusting the wiring resistance ratio of wiring lines.

A further object of the present invention is to provide a display apparatus that achieves an improvement in display quality by preventing crosstalk and an unevenness of display due to the wiring resistance difference between the wiring lines.

A still further object of the present invention is to provide a display apparatus that achieves a compact and thin-peripheral portion construction while achieving an improvement in display quality by adjusting the wiring resistance ratio of wiring lines.

To achieve the above objects, a display apparatus according to the present invention comprises a first substrate having a first driving electrode and a second driving electrode, a second substrate having a first wiring line and a second wiring line, and a seal member for facing the first substrate and the second substrate each other with a gap is filled with an electro-optical conversion material therein, and the seal member has electrical conductivity, wherein the first and second driving electrodes are formed extending substantially straight across a display area, the first driving electrode is electrically connected at a first transfer-connection position to the first wiring line, and the second driving electrode is electrically connected at a second transfer-connection position to the second wiring line, and the first transfer-connection position is provided at a position offset in a first direction from an extended line of the first driving electrode and the second transfer-connection position is provided at a position offset in a second direction, which is different from the first direction, from an extended line of the first driving electrode so as to adjust the wiring resistance of the first and second wiring lines.

In the above structure, as the transfer-connection positions are located at positions offset from the extended lines of the driving electrodes, a dead space in the wiring area can be used for such purposes as lowering the wiring resistance and avoiding obstacles. Here, the first driving electrode may be electrically connected at the first transfer-connection position to the first wiring line via the seal member, and the second driving electrode may be electrically connected at the second transfer-connection position to the second wiring line via the seal member.

By adjusting the difference in resistance between the plurality of wiring lines, as the unevenness of display occurring due to the wiring resistance difference can be prevented and crosstalk reduced, the display quality improves. Further, the reliability of the transfer connections increases because the conduction areas for the transfer-connection positions can be secured. Furthermore, because not only can effective use be made of the areas where the wiring lines are formed, but also these areas can be reduced, the peripheral portion area and/or the overall size of the display apparatus can be reduced.

Preferably, in the display apparatus according to the present invention, the first driving electrode has a first bent portion which is located outside the display area, and the first transfer-connection position is offset from the extended line of the first driving electrode in the first direction by the first bent portion; likewise, the second driving electrode has a second bent portion which is located outside the display area, and the second transfer-connection position is offset from the extended line of the second driving electrode in the second direction by the second bent portion.

By adjusting the difference in resistance between the plurality of wiring lines by using the bent portions, since the unevenness of display occurring due to the wiring resistance difference can be prevented and crosstalk reduced, the display quality improves. Further, the reliability of the transfer connections increases because the conduction areas for the transfer-connection positions can be secured. Furthermore, since not only can effective use be made of the areas where the wiring lines are formed, but these areas can be also be reduced, the peripheral portion area and/or the overall size of the display apparatus can be reduced.

Preferably, in the display apparatus according to the present invention, the first wiring line is located along a first side of the second substrate outside of the display area, the second wiring line is located along a second side of the second substrate outside of the display area, the second side being opposite to the first side, wherein the first transfer-connection position is located in a portion extending along the first side, and the second transfer-connection position is located in a portion extending along the second side.

In the above structure, a dead space outside the display area can be used for such purposes as adjusting the wiring resistance and avoiding obstacles. By adjusting the difference in resistance between the plurality of wiring lines, as the unevenness of display occurring due to the wiring resistance difference can be prevented and crosstalk reduced, the display quality improves. Further, the reliability of the transfer connections increases because the conduction areas for the transfer-connection positions can be secured. In particular, by making effective use of the dead space on the left and right sides of the display apparatus, and by reducing the areas where the wiring lines are formed, the peripheral portion area and/or the overall size of the display apparatus can be reduced.

Preferably, in the display apparatus according to the present invention, the second substrate has an extended portion extending beyond the first substrate, the first wiring line and the second wiring line are routed from the extended portion into an area where the electro-optical conversion material is placed, and the first driving electrode located nearer to the extended portion is electrically connected at the first transfer-connection position to the first wiring line, wherein the first transfer-connection position is located offset from the extended line of the first driving electrode in a direction away from the extended portion.

With this structure, the length of the first wiring line can be increased, thus increasing the wiring resistance of the first wiring line. Since this serves to prevent the unevenness of display due to the wiring resistance difference and reduce the crosstalk, the display quality improves.

Preferably, in the display apparatus according to the present invention, the second substrate has an extended portion extending beyond the first substrate, the first wiring line and the second wiring line are routed from the extended portion into an area where the electro-optical conversion material is placed, and the second driving electrode located farther from the extended portion is electrically connected at the second transfer-connection position to the second wiring line, wherein the second transfer-connection position is located offset from the extended line of the second driving electrode in a direction toward the extended portion.

With this structure, the length of the second wiring line can be reduced, reducing the wiring resistance of the second wiring line. Since this serves to prevent the unevenness of display due to the wiring resistance difference and reduce the crosstalk, the display quality improves.

Preferably, in the display apparatus according to the present invention, the wiring resistance per unit length of the first or the second driving electrode is smaller in a portion thereof extending from the display area to the first or the second transfer-connection position than in a portion thereof located within the display area.

With this structure, it becomes possible to prevent the wiring resistance of the driving electrode from increasing (that is, the resistance can be lowered compared with the prior art). As this serves to eliminate the difference in resistance between the plurality of wiring lines and thereby prevent the unevenness of display due to the wiring resistance difference and reduce the crosstalk, the display quality improves.

Preferably, in the display apparatus according to the present invention, the electrode width of the first or the second driving electrode is smaller in a portion thereof extending from the display area to the first or the second transfer-connection position than the electrode width thereof located within the display area.

With this structure, it becomes possible to prevent the wiring resistance of the driving electrode from increasing (that is, the resistance can be lowered compared with the prior art). Since this serves to eliminate the difference in resistance between the plurality of wiring lines and thereby prevent the unevenness of display due to the wiring resistance difference and reduce the crosstalk, the display quality improves.

Preferably, in the display apparatus according to the present invention, the seal member contains electrically conductive particles.

With this structure, it becomes possible to form the transfer-connection positions on the seal member and, as a result, the number of manufacturing steps can be reduced.

To achieve the above objects, a display apparatus according to the present invention comprises a first substrate having a first driving electrode group containing a plurality of driving electrodes and a second driving electrode group containing a plurality of driving electrodes, a second substrate having a first wiring line group containing a plurality of wiring lines and a second wiring line group containing a plurality of wiring lines, and a seal member for facing the first substrate and the second substrate each other with a gap filled with an electro-optical conversion material therein, and the seal member has electrical conductivity, wherein the plurality of driving electrodes contained in the first driving electrode group are electrically connected at a plurality of first transfer-connection positions to respective ones of the plurality of wiring lines contained in the first wiring line group, and the plurality of driving electrodes contained in the second driving electrode group are electrically connected at a plurality of second transfer-connection positions to respective ones of the plurality of wiring lines contained in the second wiring line group, and the plurality of first transfer-connection positions are provided at positions respectively offset in a first direction from extended lines of the plurality of driving electrodes contained in the first driving electrode group, and the plurality of second transfer-connection positions are provided at positions respectively offset in a second direction, which is different from the first direction, from extended lines of the plurality of driving electrodes contained in the second driving electrode group so that the wiring resistance of the plurality of wiring lines contained in the first wiring line group and the wiring resistance of the plurality of wiring lines contained in the second wiring line group will change at a substantially constant rate.

With this structure, it becomes possible to make an adjustment so that the wiring resistance of the plurality of wiring lines contained in the first wiring line group and the wiring resistance of the plurality of wiring lines contained in the second wiring line group will change at a substantially constant rate and, thus, the display can be produced without making visible the border between the display portion driven by the first driving electrode group and the display portion driven by the second driving electrode group.

To achieve the above objects, a display apparatus according to the present invention comprises a first substrate having a first driving electrode group containing a plurality of driving electrodes and a second driving electrode group containing a plurality of driving electrodes, a second substrate having a first wiring line group containing a plurality of wiring lines and a second wiring line group containing a plurality of wiring lines, and a seal member for facing the first substrate and the second substrate each other with a gap filled with an electro-optical conversion material therein, and the seal member has electrical conductivity, wherein the plurality of driving electrodes contained in the first driving electrode group are electrically connected at a plurality of first transfer-connection positions to respective ones of the plurality of wiring lines contained in the first wiring line group, and the plurality of driving electrodes contained in the second driving electrode group are electrically connected at a plurality of second transfer-connection positions to respective ones of the plurality of wiring lines contained in the second wiring line group, and the plurality of first transfer-connection positions are provided at positions respectively offset in a first direction from extended lines of the plurality of driving electrodes contained in the first driving electrode group, and the plurality of second transfer-connection positions are provided at positions respectively offset in a second direction, which is different from the first direction, from extended lines of the plurality of driving electrodes contained in the second driving electrode group so that the wiring resistance of the plurality of wiring lines contained in the first wiring line group and the wiring resistance of the plurality of wiring lines contained in the second wiring line group have substantially the same resistance value.

With this structure, the wiring resistance (Ω) can be made substantially the same for all the driving electrodes arranged in the display area, even when the number (N) of driving electrodes increases; as a result, the unevenness of display occurring due to the wiring resistance difference can be prevented and crosstalk reduced, and thus the display quality improves.

According to the display apparatus of the present invention, by adjusting the resistance difference between the plurality of wiring lines, the unevenness of display due to the wiring resistance difference can be prevented and/or the crosstalk can be reduced, thus achieving an improvement in display quality.

Further, according to the display apparatus of the present invention, it becomes possible to make an adjustment so that the wiring resistance of the plurality of wiring lines contained in the first wiring line group and the wiring resistance of the plurality of wiring lines contained in the second wiring line group will change at a substantially constant rate and, thus, the display can be produced without making visible the border between the display portion driven by the first driving electrode group and the display portion driven by the second driving electrode group.

Furthermore, according to the display apparatus of the present invention, by eliminating the resistance difference between the plurality of wiring lines, the unevenness of display due to the wiring resistance difference can be prevented and/or the crosstalk can be reduced, thus achieving an improvement in display quality.

Moreover, according to the display apparatus of the present invention, the reliability of the transfer connections increases because the conduction areas for the transfer-connection positions can be secured. In particular, by making effective use of the dead space on the left and right sides of the display apparatus, and by reducing the areas where the wiring lines are formed, the peripheral portion area and/or the overall size of the display apparatus can be reduced.

BRIEF DESCRIPTION OF THE DRAWINGS

The present invention will be more clearly understood from the description of the preferred embodiments as set forth below with reference to the accompanying drawings.

DETAILED DESCRIPTION OF THE INVENTION

A first embodiment of the present invention will be described below with reference to FIGS. 1 to 4.

Figure 1:
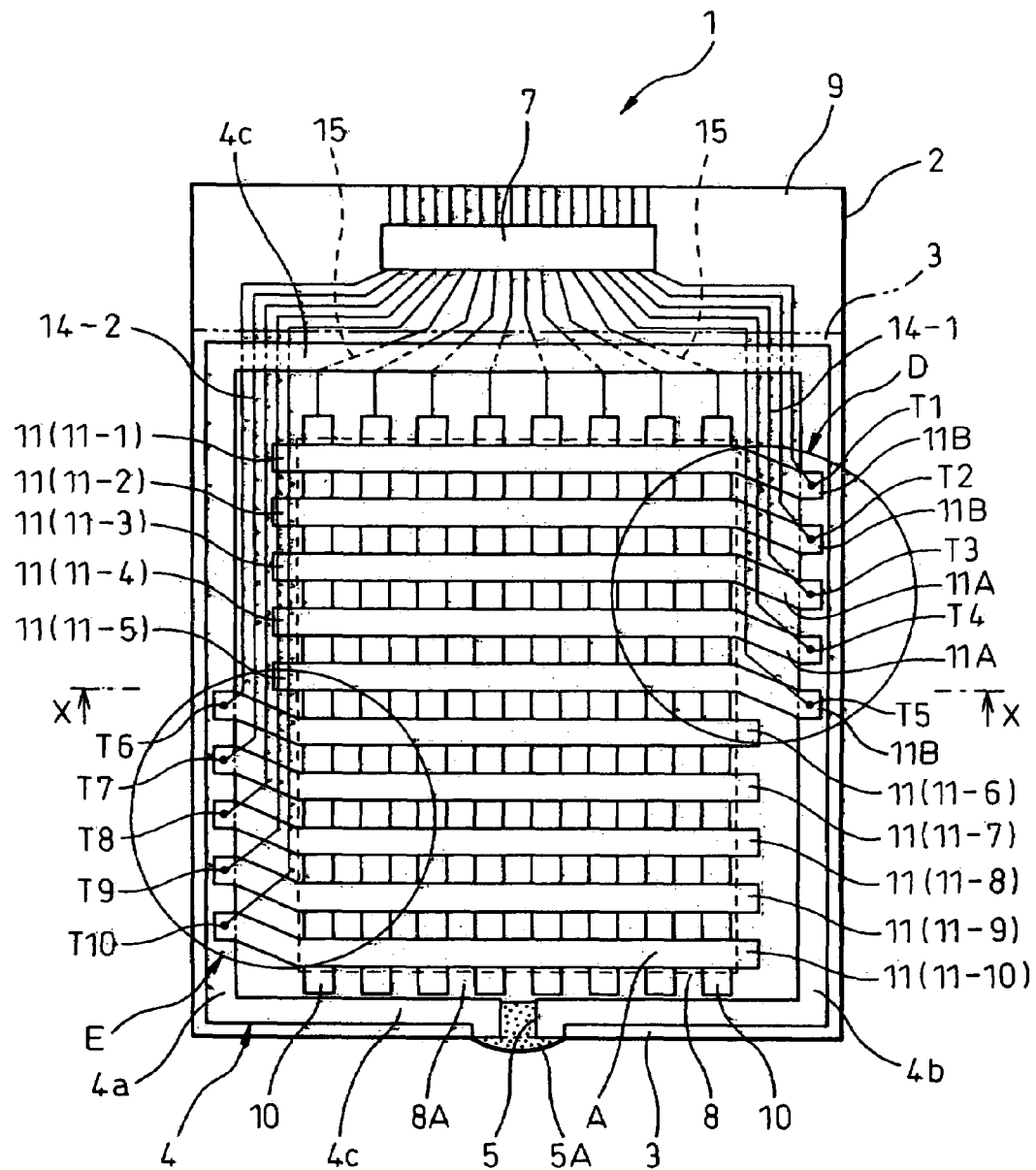
FIG. 1 is a schematic plan view of a display apparatus according to a first embodiment of the present invention.
Figure 2:
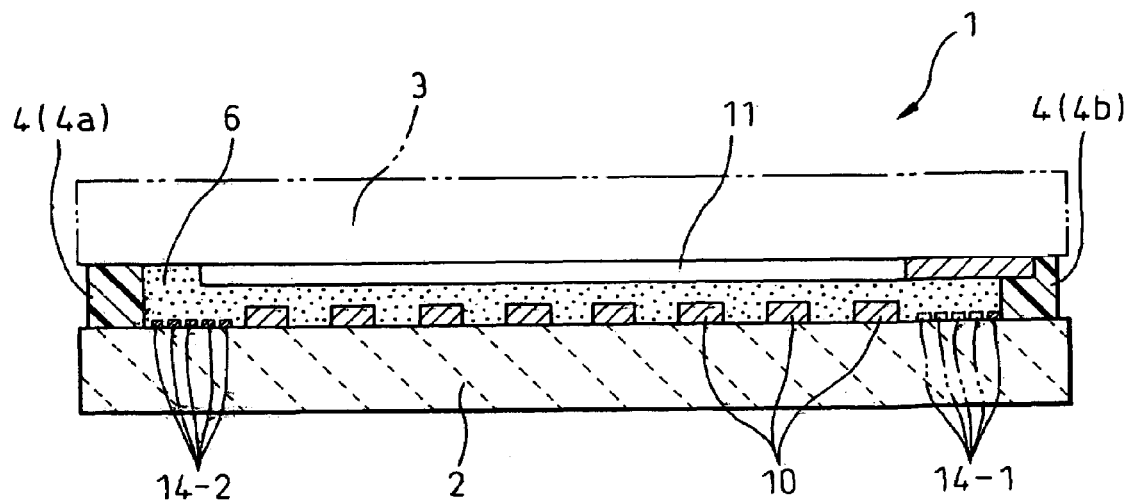
FIG. 2 is a cross-sectional view taken along line X-X in FIG. 1.
Figure 3:
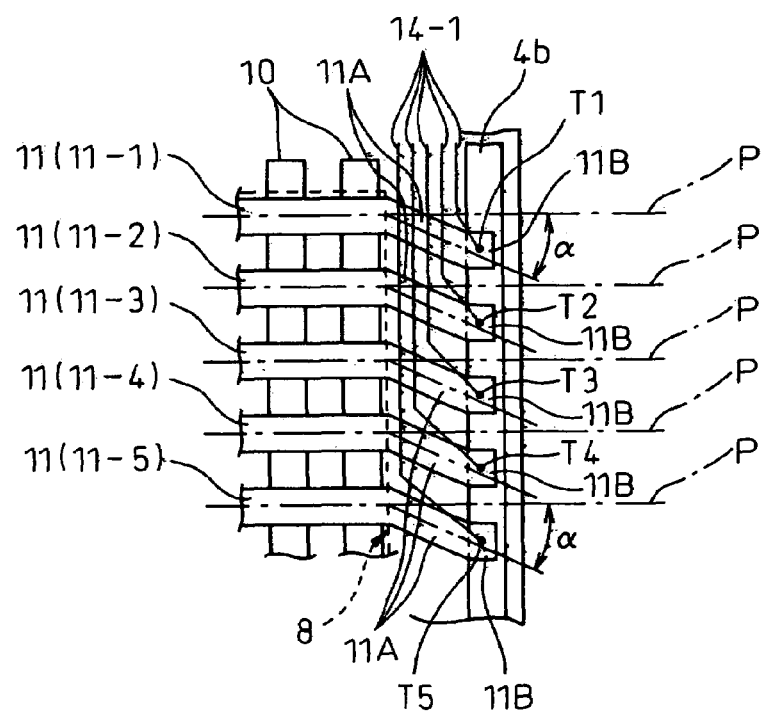
FIG. 3 is an enlarged view of area D in FIG. 1.
Figure 4:
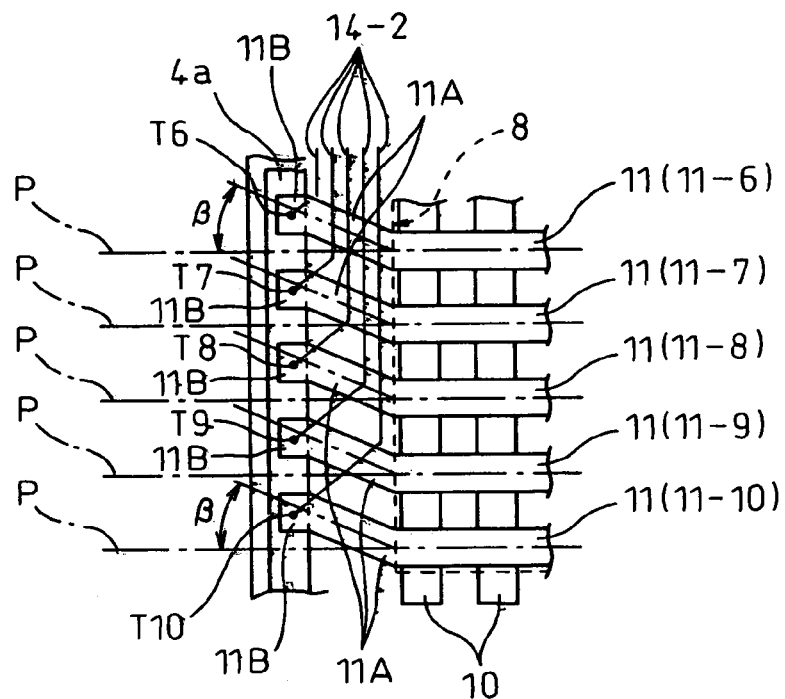
FIG. 4 is an enlarged view of area E in FIG. 1.

FIG. 1 is a schematic plan view of a display apparatus 1 according to the present invention, FIG. 2 is a cross-sectional view taken along line X-X in FIG. 1, FIG. 3 is a diagram for explaining transfer connections in area D in FIG. 1, and FIG. 4 is a diagram for explaining transfer connections in area E in FIG. 1.

The display apparatus 1 of the present invention is an example in which the present invention is applied to a passive matrix transflective color liquid crystal display apparatus, but it will be appreciated that the present invention can also be applied to other types of liquid crystal display apparatus.

As shown in FIGS. 1 and 2, in the display apparatus 1, a rectangular lower substrate 2 (one substrate) and a rectangular upper substrate 3 (the other substrate) are arranged opposite each other by sandwiching therebetween a seal member 4 of a square shape having a hollow interior space (i.e., a frame-like shape). The seal member 4 includes a liquid crystal injection port 5 which is shown in the lower of FIG. 1. A liquid crystal 6 as an electro-optical conversion material is injected through the liquid crystal injection port 5 into the space (arrangement space) enclosed by the lower substrate 2, the upper substrate 3, and the seal member 4, and the liquid crystal injection port 5 is closed by a sealant 5A.

The seal member 4 is constructed from an anisotropic conductive seal member formed by mixing electrically conductive particles into an insulating adhesive material. In some cases, the seal member includes insulating particles in addition to the conductive particles. In FIG. 1, a seal portion 4c on the shorter side extending along the upper sides of the lower substrate 2 and the upper substrate 3 (the two opposing shorter sides of the rectangles), a seal portion 4a on the longer side extending along the left sides of the lower substrate 2 and the upper substrate 3 (the two opposing longer sides of the rectangles), and a seal portion 4b on the longer side extending along the right sides of the lower substrate 2 and the upper substrate 3, are formed by mixing a conductive material composed of conductive particles, and are thus made to function as electrical conduction portions as well as portions for sealing the liquid crystal 6. The conductive particles are formed by mixing 0.5 to 1.0% by weight of Au-plated resin particles of 6 to 8 φ into the insulating adhesive material of the seal member 4. It is preferable that the area for connection at a transfer-connection position is 0.09 mm$^2$ or larger.

The lower substrate 2 has larger outer dimensions than the upper substrate 3, and the upper substrate 3 and the lower substrate 2 are arranged in such a manner that their edges (end faces of the substrates) on three sides (the lower, right, and left sides in FIG. 1) are substantially aligned with each other. However, the lower substrate 2 has an extended portion 9 extending beyond the remaining one side (the upper side in FIG. 1) of the upper substrate 3. A driver IC 7 constructed from a semiconductor device, for driving the electrodes (driving electrodes 11 and signal electrodes 10) on the upper substrate 3 and the lower substrate 2, is mounted on the extended portion 9.

As shown in FIGS. 1 and 2, the plurality of signal electrodes 10 extending in the vertical direction in FIG. 1 are deposited in the form of stripes on the lower substrate 2. On the other hand, the plurality of driving electrodes 11 extending in the horizontal direction in FIG. 1 are deposited in the form of stripes on the upper substrate 3 in such a manner as to intersect at right angles with the signal electrodes 10. Pigment layers forming R, G, and B color filters (not shown) are arranged along the direction of each signal electrode 10.

In FIG. 1, the dashed lines indicated at reference numeral 8 define the periphery of an area (image display area A) containing a group of display pixels (pixels contributing to image display) formed at the intersections between the signal electrodes 10 and the driving electrodes 11, and also define the inside edges of a surrounding light blocking layer 8A for preventing light from entering the display area A from the sides thereof. The surrounding light blocking layer 8A is formed so as to shield wiring areas from light, which are areas on the lower substrate 2 where the wiring lines 14-1 and 14-2 to be described later are formed. Further, a light blocking film is provided between each pixel in the display area A.

Of the plurality of driving electrodes 11 (10 electrodes are shown in FIG. 1), the ends (the right ends in FIG. 1) of the driving electrodes 11-1 to 11-5 in the upper half of FIG. 1 (the upper five electrodes in FIG. 1) are connected to the wiring lines 14-1 at the respective transfer-connection positions T1 to T5 on the longer-side seal portion 4b. As shown in FIG. 3, the transfer-connection positions T1 to T5 are displaced (offset) from the straight extended lines P of the driving electrodes 11-1 to 11-5 in the direction opposite to the driver IC 7 (i.e., away from the extended portion 9).

That is, the end portions (the right end portions in FIG. 1) of the driving electrodes 11-1 to 11-5 are bent at an angle α relative to the extended lines P in the direction away from the driver IC 7 (the extended portion 9). Further, each bent portion 11A is formed so that its end portion 11B extends parallel to the extended line P, and the transfer-connection positions T1 to T5 are located on the end portions 11B of the respective bent portions 11A. The driving electrodes 11-1 to 11-5 are electrically connected at the respective transfer-connection positions T1 to T5 to the driving electrode wiring lines (first wiring lines) 14-1 on the lower substrate 2 via the conductive material, such as conductive particles, mixed in the longer-side seal portion 4b.

The first wiring lines 14-1 are routed into the area enclosed by the seal member 4, and then bent upward so as to extend along the right side of the lower substrate 2 in FIG. 1. After crossing the shorter-side seal portion 4c, the first wiring lines 14-1 are routed further upward in FIG. 1, and connected to output terminals (not shown) of the driver IC 7 mounted on the extended portion 9.

Likewise, the ends (the left ends in FIG. 1) of the driving electrodes 11-6 to 11-10 in the lower half of FIG. 1 (five electrodes are shown in FIG. 1) are connected to the wiring lines 14-2 at the respective transfer-connection positions T6 to T10 on the longer-side seal portion 4a. As shown in FIG. 4, the transfer-connection positions T6 to T10 are displaced (offset) from the straight extended lines P of the driving electrodes 11-6 to 11-10 in the direction toward the driver IC 7 (i.e., toward the extended portion 9).

That is, the end portions (the left end portions in FIG. 1) of the driving electrodes 11-6 to 11-10 are bent at an angle β relative to the extended lines P in the direction toward the driver IC 7 (the extended portion 9). Further, each bent portion 11A is formed so that its end portion 11B extends parallel to the extended line P, and the transfer-connection positions T6 to T10 are located on the end portions 11B of the respective bent portions 11A. The driving electrodes 11-6 to 11-10 are electrically connected at the respective transfer-connection positions T6 to T10 to the driving electrode wiring lines (second wiring lines) 14-2 on the lower substrate 2 via the conductive material, such as conductive particles, mixed in the longer-side seal portion 4a.

The second wiring lines 14-2 are routed into the area enclosed by the seal member 4, and then bent upward so as to extend along the left side of the lower substrate 2 in FIG. 1. Here, the second wiring lines 14-2 are bent at a sharp angle for connection to the transfer-connection positions T6 to T10. This structure serves to reduce the routing lengths of the second wiring lines 14-1. After crossing the shorter-side seal portion 4c, the second wiring lines 14-2 are routed further upward in FIG. 1, and connected to output terminals (not shown) of the driver IC 7 mounted on the extended portion 9.

In this way, the first wiring lines 14-1 and the second wiring lines 14-2 are placed within the light blocking area formed inwardly of the longer-side seal portions 4a and 4b but outside the inner edges of the light blocking layer 8A. Further, the first wiring lines 14-1 and the second wiring lines 14-2 are routed through the light blocking area and past the shorter-side seal portion 4c, and connected to the output terminals of the driver IC 7 mounted on the extended portion 9.

For the signal electrodes 10, on the other hand, signal electrode wiring lines 15 are brought out from the upper ends of the signal electrodes 10 toward the shorter-side seal portion 4c, and are connected to the corresponding output terminals of the driver IC 7.

Figure 5:
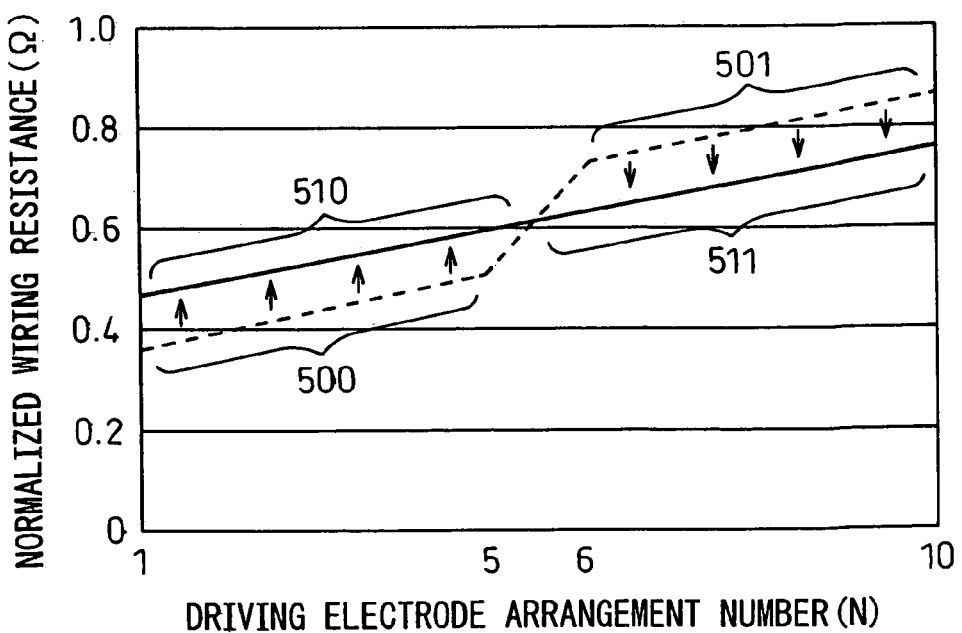
FIG. 5 is a diagram showing an example of how wiring resistance is improved in the display apparatus according to the first embodiment of the present invention.
Figure 13:
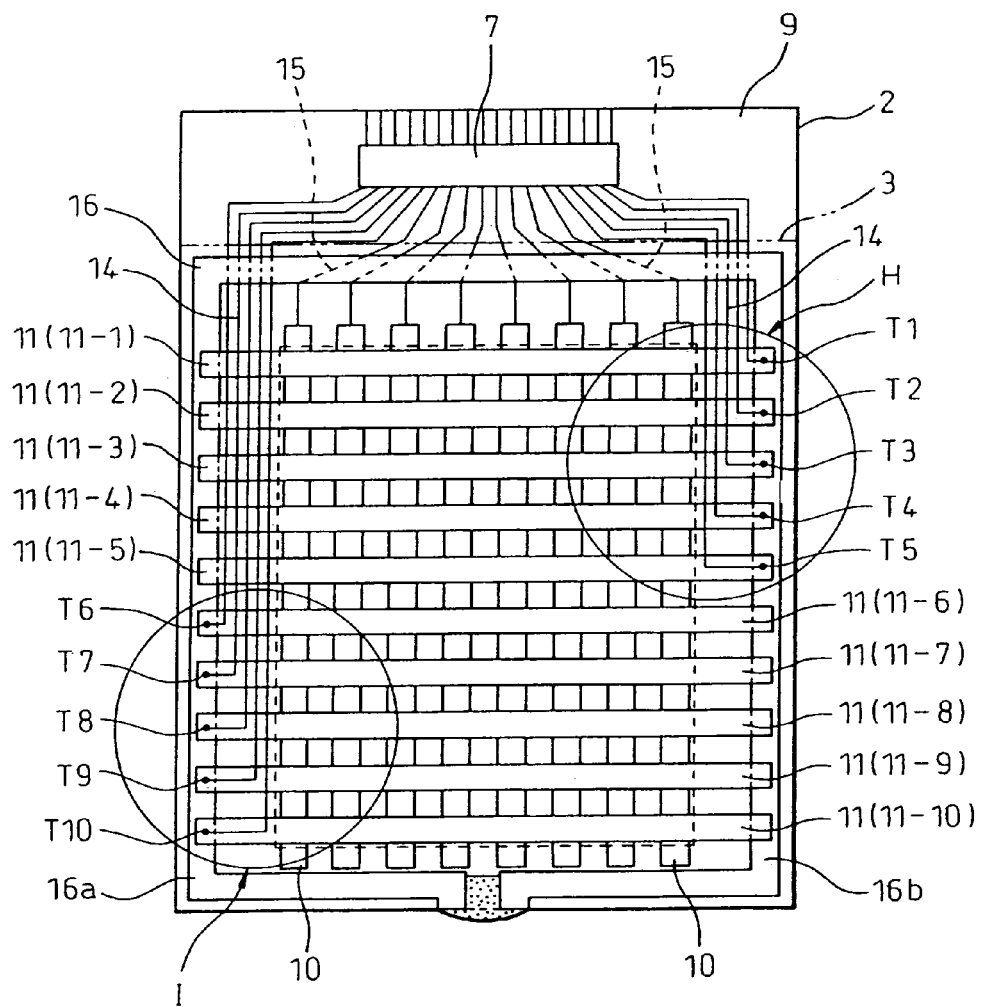
FIG. 13 is a schematic plan view of a prior art display apparatus.
Figure 14:
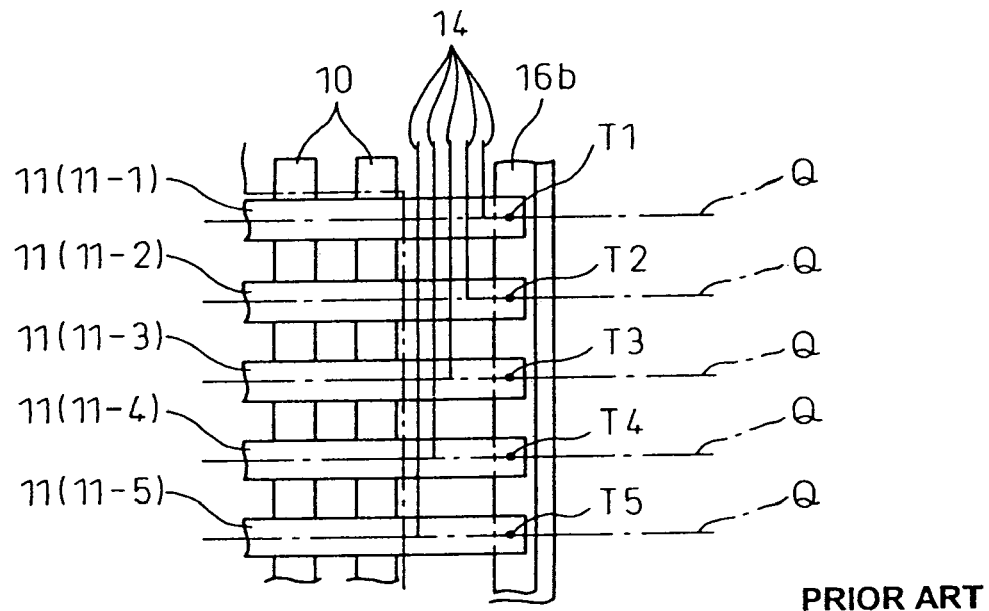
FIG. 14 is an enlarged view of area H in FIG. 13.
Figure 15:
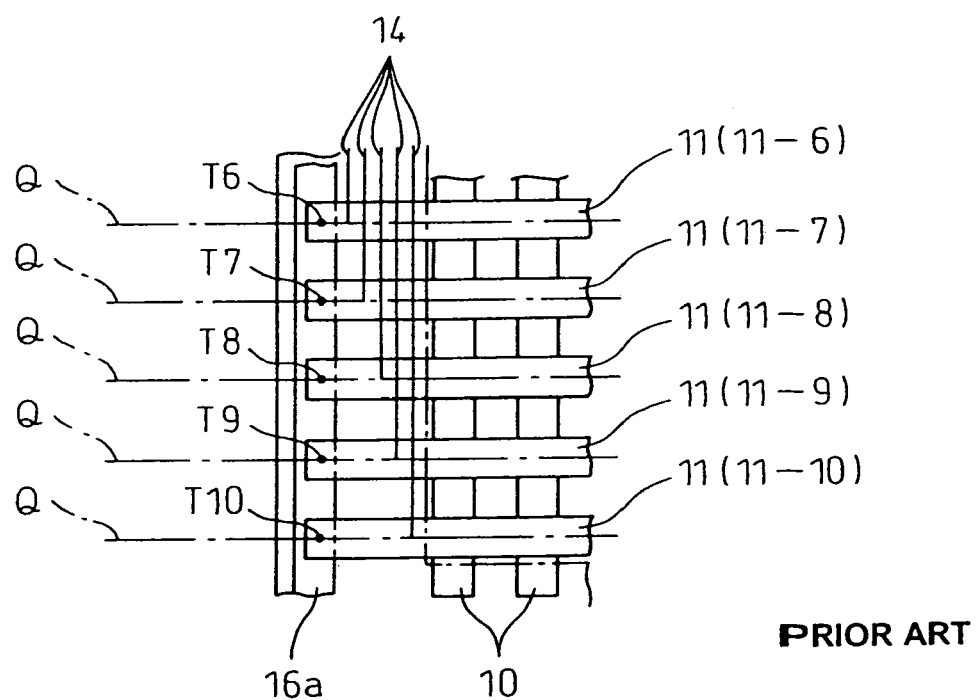
FIG. 15 is an enlarged view of area I in FIG. 13.

In the display apparatus 1 shown in FIGS. 1 to 4, the end portions of the driving electrodes 11-1 to 11-5 in the upper half are bent so as to shift the transfer-connection positions T1 to T5 in the direction away from the driver IC relative to the extended lines P of the respective driving electrodes. As a result, compared with the prior art example shown in FIG. 13, the routing length of each first wiring lines 14-1 increases, thus increasing the wiring resistance of the first wiring line 14-1. That is, as shown in FIG. 5, the wiring resistance 500 (see 1400 in FIG. 16) in the prior art improves to the wiring resistance 510 in the present embodiment. For the bend angle α of the bent portion 11A, an optimum value can be selected according to the shape of the display apparatus 1, etc.

Further, the end portions of the driving electrodes 11-6 to 11-10 in the lower half of FIG. 1 are bent so as to shift the transfer-connection positions T6 to T10 in the direction toward the driver IC relative to the extended lines P of the driving electrodes. As a result, compared with the prior art example shown in FIG. 13, the routing length of each second wiring line 14-2 is reduced, thus reducing the wiring resistance of the second wiring line 14-2. That is, as shown in FIG. 5, the wiring resistance 501 (see 1401 in FIG. 16) in the prior art improves to the wiring resistance 511 in the present embodiment. For the bend angle β of the bent portion 11A, an optimum value can be selected according to the shape of the display apparatus 1, etc.

Figure 16:
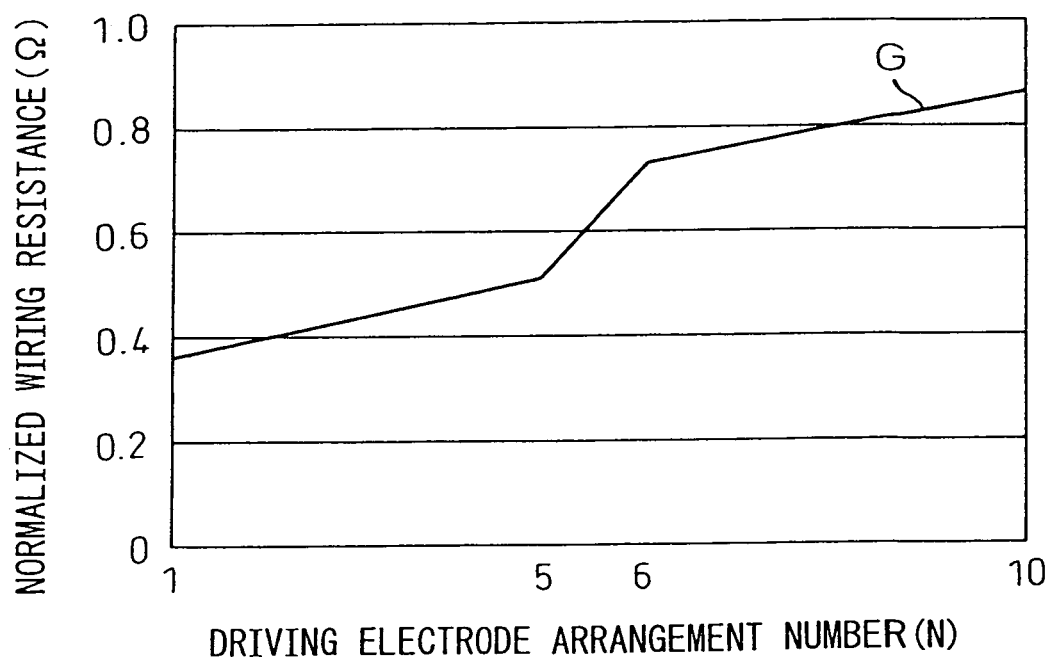
FIG. 16 is a diagram showing an example of how wiring resistance changes in the prior art display apparatus.

With the above structure, the wiring resistance which, in the prior art, has a large step across the border between the upper and lower driving electrode groups, as shown in FIG. 16, has been improved so that the wiring resistance changes gradually and uniformly across the entire screen. The present embodiment thus solves the problem that the display quality degrades due to the border that becomes visible between the upper half, where display operation is controlled by the driving electrodes 11-1 to 11-5, and the lower half, where display operation is controlled by the driving electrodes 11-6 to 11-10.

Figure 6:
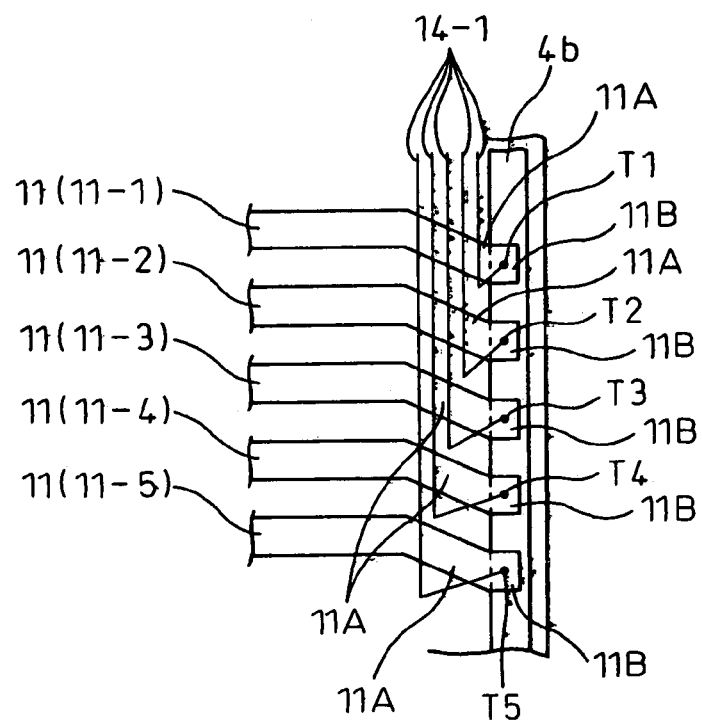
FIG. 6 is a diagram showing a modified example of the routing of wiring in FIG. 1.

FIG. 6 shows a modified example of the display apparatus 1 according to the first embodiment of the present invention. FIG. 6 corresponds to FIG. 3 that shows an enlarged view of the area D in FIG. 1. In FIG. 3, the first wiring lines 14-1 are connected to the respective transfer-connection positions T1 to T5 without crossing the bent portions 11A of the corresponding driving electrodes 11-1 to 11-5. On the other hand, in the example of FIG. 6, by making use of the space near the transfer-connection positions T1 to T5, the first wiring lines 14-1 are routed so as to pass the bent portions 11A of the corresponding driving electrodes 11-1 to 11-5 once and, then, are bent upward for connection to the respective transfer-connection positions T1 to T5. By routing the first wiring lines 14-1 in this manner, an adjustment can be made to further increase the wiring resistance of the first wiring lines 14-1.

Figure 7:
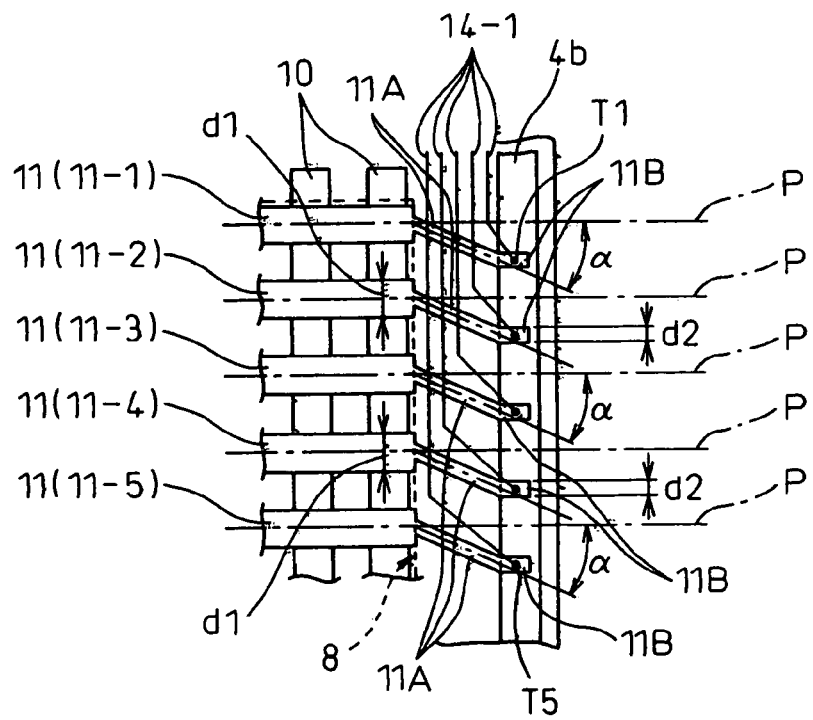
FIG. 7 is a diagram showing a modified example of driving electrodes in the area D in FIG. 1.
Figure 8:
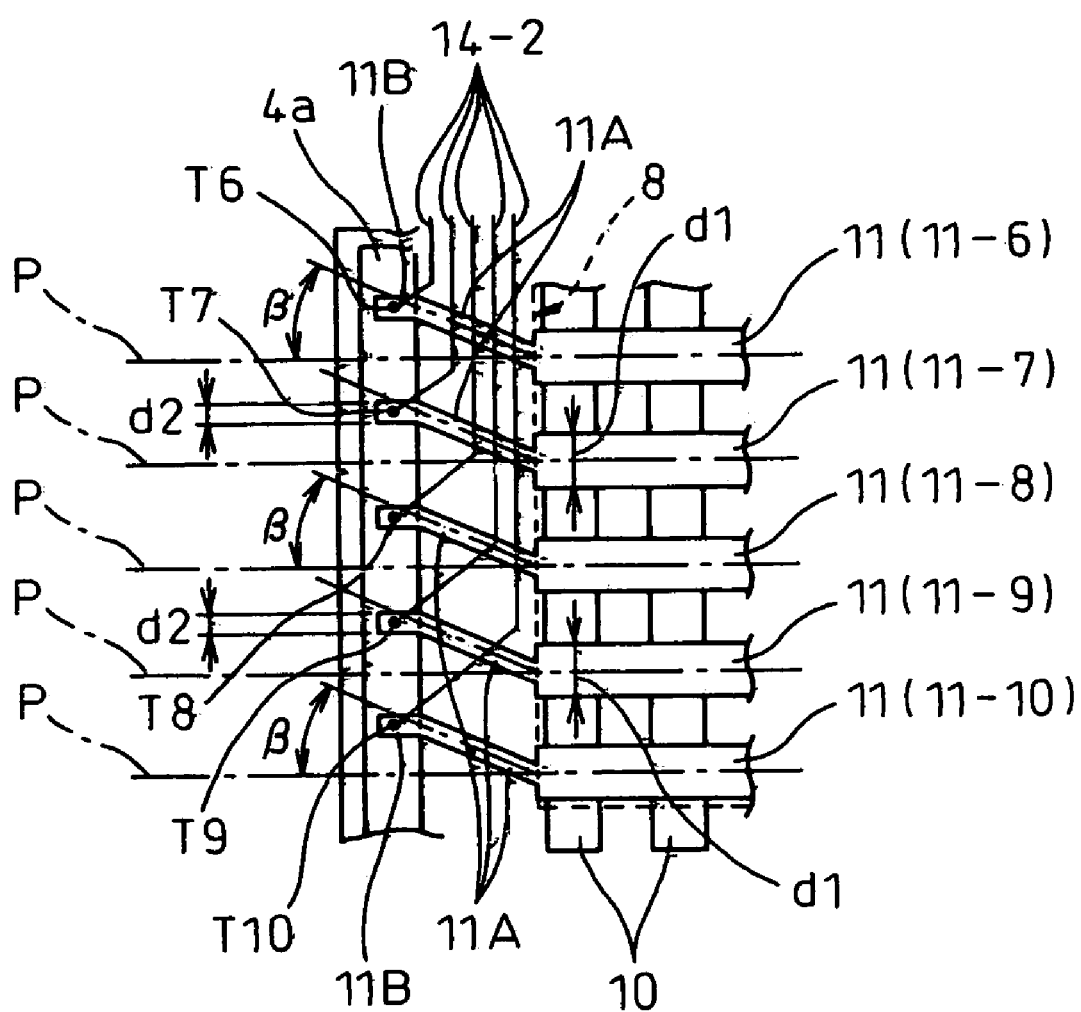
FIG. 8 is a diagram showing a modified example of driving electrodes in the area E in FIG. 1.

FIGS. 7 and 8 show another modified example of the display apparatus 1 according to the first embodiment of the present invention. FIG. 7 corresponds to FIG. 3 that shows an enlarged view of the area D in FIG. 1, and FIG. 8 corresponds to FIG. 4 that shows an enlarged view of the area E in FIG. 1.

In FIGS. 7 and 8, the electrode width d2 of each bent portion including its end portion, i.e., the driving electrode portion extending from the display area A to the corresponding one of the transfer-connection positions T1 to T10, is made smaller than the electrode width d1 of the portion of the driving electrode 11 lying within the display area A. In other words, the wiring resistance of the bent portion, including the end portion, of each of the driving electrodes 11-1 to 11-10 extending from the display area A to the transfer-connection positions T1 to T10, is made higher than the wiring resistance of the portion of the driving electrode 11 lying within the display area A.

With the structure shown in FIGS. 7 and 8, it becomes possible to increase the wiring resistance of the driving electrodes 11-1 to 11-10. Further, by forming the upper driving electrodes 11-1 to 11-5 as shown in FIG. 7 and the lower driving electrodes 11-6 to 11-10 as shown in FIG. 4, the wiring resistance of the upper driving electrodes can be made higher than that of the lower driving electrodes. Compared with the prior art apparatus, since the wiring resistance of the driving electrodes can be adjusted as desired as described above, the resistance difference between the plurality of wiring lines 14-1 (14-2) can be eliminated, and thus the unevenness of display due to the wiring resistance difference can be prevented and crosstalk reduced, achieving an improvement in display quality.

Next, a second embodiment of the present invention will be described with reference to FIGS. 9 to 11.

Figure 9:
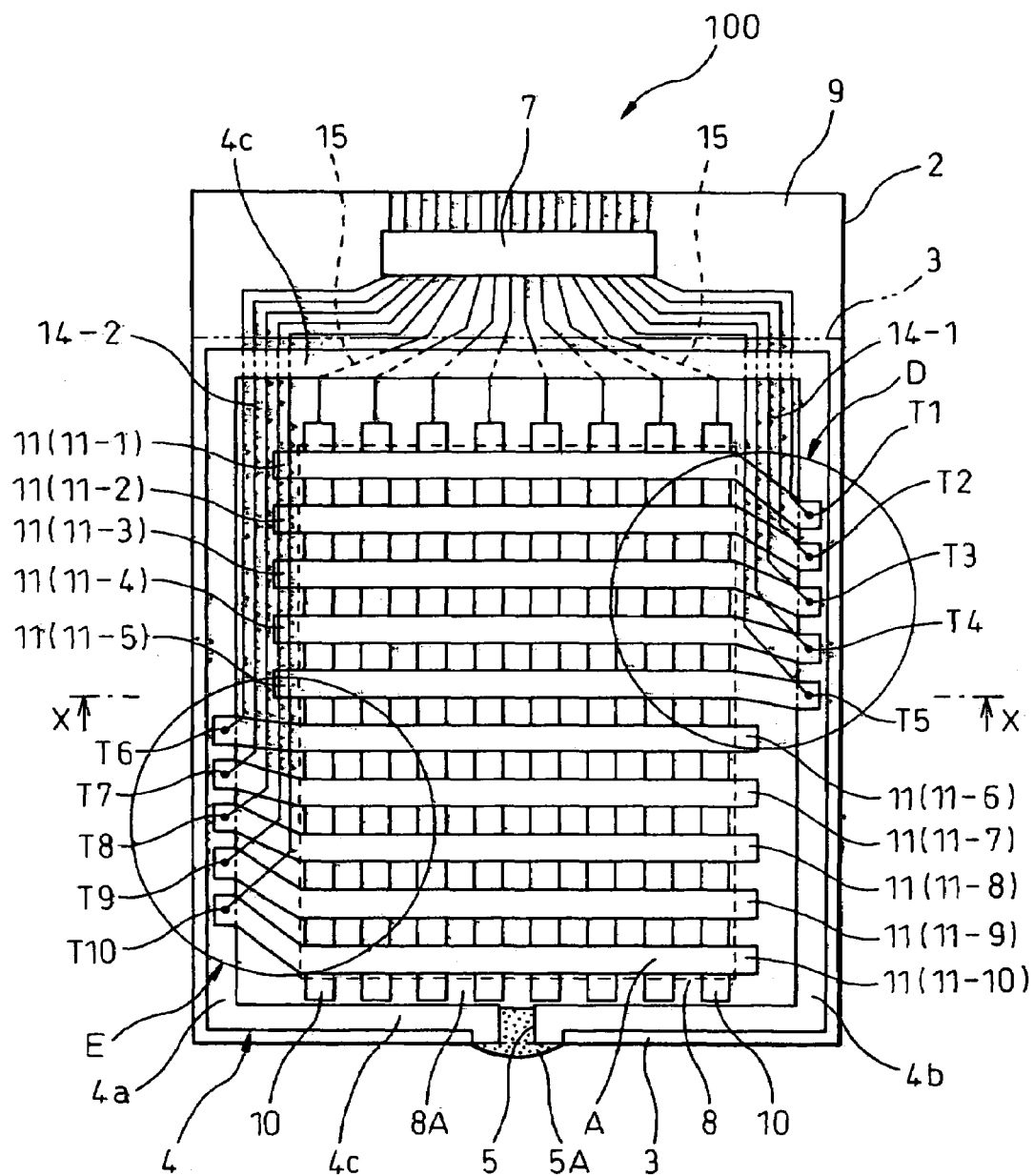
FIG. 9 is a schematic plan view of a display apparatus according to a second embodiment of the present invention.
Figure 10:
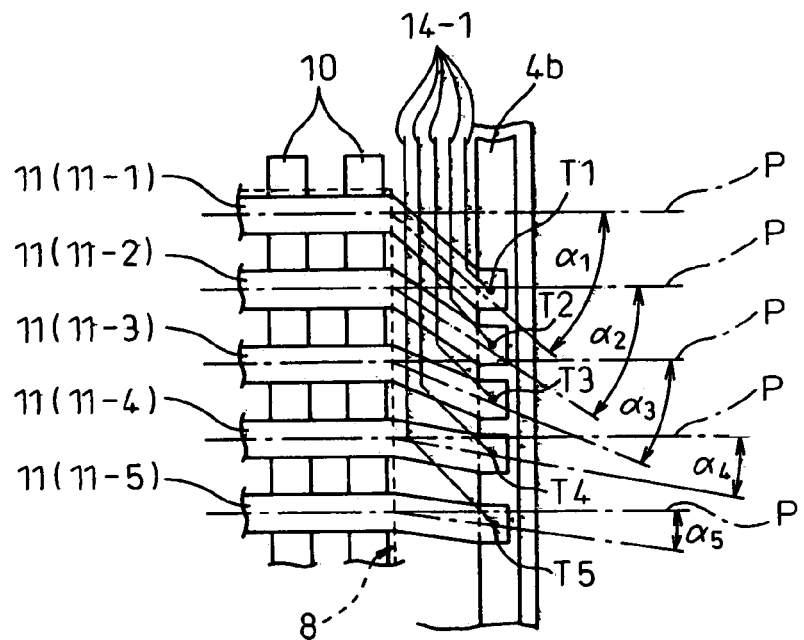
FIG. 10 is an enlarged view of area D in FIG. 9.
Figure 11:
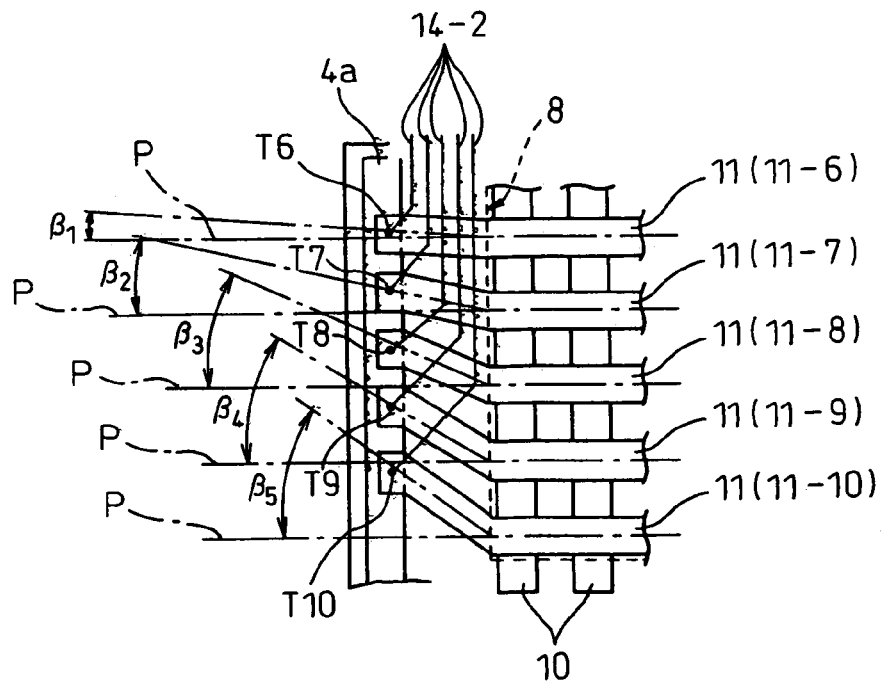
FIG. 11 is an enlarged view of area E in FIG. 9.

FIG. 9 is a schematic plan view of a display apparatus 100 according to the present invention, FIG. 10 is an enlarged view of area D in FIG. 9, and FIG. 11 is an enlarged view of area E in FIG. 9.

In the first embodiment described above, the bend angles α and β of the bent portions 11A of the driving electrodes 11 are respectively fixed. Therefore, by changing the bend angles α and β of the bent portions 11A, the wiring resistances of the first and second wiring lines 14-1 and 14-2 are adjusted so that the wiring resistance as a whole changes uniformly (see 510 and 511 in FIG. 5). However, to attain better display performance, it would be desirable that the adjustment be made so that all the wiring lines would have substantially the same wiring resistance. In view of this, in the display apparatus 100 according to the second embodiment of the present invention, the bend angle of the bent portion 11A is varied by a small amount for each successive driving electrode 11 so that all the wiring lines will have substantially the same wiring resistance. The display apparatus 100 of the present invention is an example in which the present invention is applied to a passive matrix transflective color liquid crystal display apparatus, but it will be appreciated that the present invention can also be applied to other types of liquid crystal display apparatus or CCDs or the like.

As shown in FIG. 9, the display apparatus 100 is the same as the display apparatus 1 of the first embodiment shown in FIGS. 1 to 4, except that the bend angle is varied by a small amount for each successive driving electrode 11, and therefore, the description, other than the difference, will be omitted here.

Of the plurality of driving electrodes 11 (10 electrodes are shown in FIG. 9), the ends (the right ends in FIG. 9) of the driving electrodes 11-1 to 11-5 in the upper half of FIG. 9 are connected to the wiring lines 14-1 at the respective transfer-connection positions T1 to T5 on the longer-side seal portion 4b. As shown in FIG. 10, the transfer-connection positions T1 to T5 are displaced (offset) from the straight extended lines P of the driving electrodes 11-1 to 11-5 in the direction opposite to the driver IC 7 (i.e., away from the extended portion 9).

Further, as shown in FIG. 10, the end portions (the right end portions in FIG. 9) of the driving electrodes 11-1 to 11-5 are bent at angles α1 to α5, respectively, relative to the extended lines P, in the direction away from the driver IC 7 (the extended portion 9). Here, each bent portion 11A is formed so that its end portion 11B extends parallel to the extended line P, and the transfer-connection positions T1 to T5 are located on the end portions 11B of the respective bent portions 11A. The driving electrodes 11-1 to 11-5 are electrically connected at the respective transfer-connection positions T1 to T5 to the driving electrode wiring lines (first wiring lines) 14-1 on the lower substrate 2 via the conductive material, such as conductive particles, mixed in the longer-side seal portion 4b.

Likewise, the ends (the left ends in FIG. 9) of the driving electrodes 11-6 to 11-10 in the lower half of FIG. 9 (five electrodes are shown in FIG. 9) are connected to the wiring lines 14-2 at the respective transfer-connection positions T6 to T10 on the longer-side seal portion 4a. As shown in FIG. 11, the transfer-connection positions T6 to T10 are displaced (offset) from the straight extended lines P of the driving electrodes 11-6 to 11-10 in the direction toward the driver IC 7 (i.e., toward the extended portion 9).

Further, as shown in FIG. 11, the end portions (the left end portions in FIG. 9) of the driving electrodes 11-6 to 11-10 are bent at angles β1 to β5, respectively, relative to the extended lines P, in the direction toward the driver IC 7 (the extended portion 9). Here, each bent portion 11A is formed so that its end portion 11B extends parallel to the extended line P, and the transfer-connection positions T6 to T10 are located on the end portions 11B of the respective bent portions 11A. The driving electrodes 11-6 to 11-10 are electrically connected at the respective transfer-connection positions T6 to T10 to the driving electrode wiring lines (second wiring lines) 14-2 on the lower substrate 2 via the conductive material, such as conductive particles, mixed in the longer-side seal portion 4a.

In this way, the first wiring lines 14-1 and the second wiring lines 14-2 are placed within the light blocking area formed inward of the longer-side seal portions 4a and 4b but outside the inner edges of the light blocking layer 8A. Further, the first wiring lines 14-1 and the second wiring lines 14-2 are routed through the light blocking area and past the shorter-side seal portion 4c, and connected to the output terminals of the driver IC 7 mounted on the extended portion 9.

Figure 12:
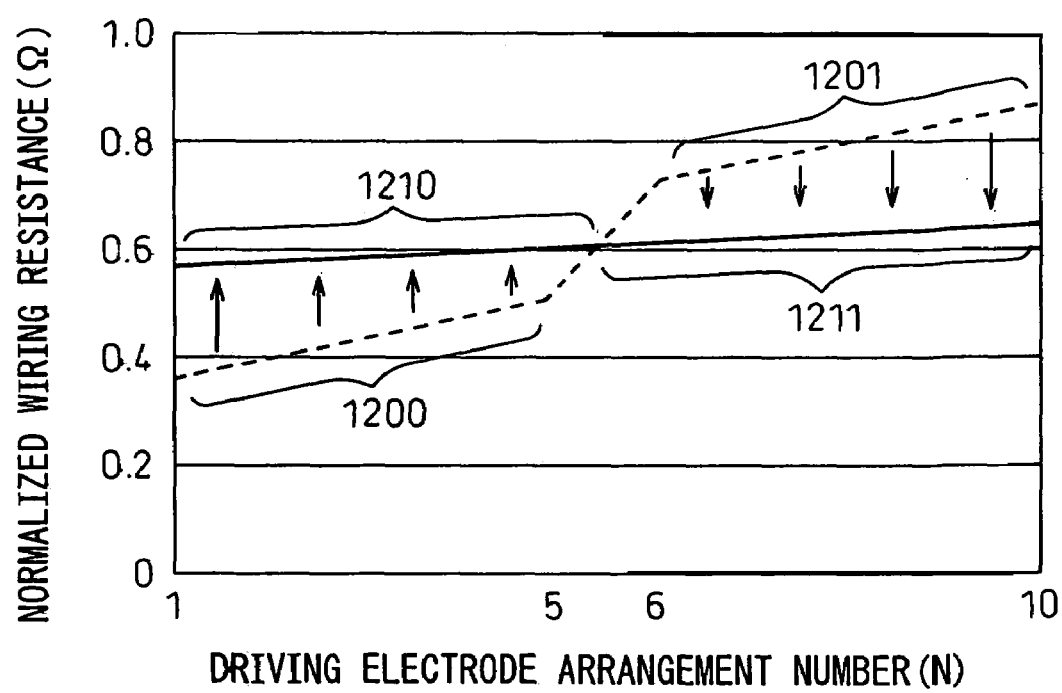
FIG. 12 is a diagram showing an example of how wiring resistance is improved in the display apparatus according to the second embodiment of the present invention.

In the display apparatus 100 shown in FIGS. 9 to 11, the end portions of the driving electrodes 11-1 to 11-5 in the upper half are bent at angles α1 to α5, respectively, thereby shifting the transfer-connection positions T1 to T5 in the direction away from the driver IC relative to the extended lines P of the driving electrodes. As a result, compared with the prior art example shown in FIG. 13, the routing length of each first wiring line 14-1 increases, thus changing the wiring resistance of the first wiring line 14-1. The degree of change is larger for the driving electrode 11-1 nearer to the driving IC 7 and smaller for the driving electrode 11-5 farther from the driving IC 7. Accordingly, as shown in FIG. 12, the wiring resistance 1200 (see 1400 in FIG. 16) in the prior art improves to the wiring resistance 1210 in the present embodiment. For the bend angles α1 to α5 of the respective bent portions 11A, optimum values can be selected according to the shape of the display apparatus 100, etc.

Further, the end portions of the driving electrodes 11-6 to 11-10 in the lower half are bent at angles β1 to β5, respectively, thereby shifting the transfer-connection positions T6 to T10 in the direction toward the driver IC relative to the extended lines P of the driving electrodes. As a result, compared with the prior art example shown in FIG. 13, the routing length of each second wiring line 14-2 changes in the decreasing direction, thus changing the wiring resistance of the second wiring line 14-2. The degree of change is smaller for the driving electrode 11-6 nearer to the driving IC 7 and larger for the driving electrode 11-10 farther from the driving IC 7. Accordingly, as shown in FIG. 12, the wiring resistance 1201 (see 1401 in FIG. 16) in the prior art improves to the wiring resistance 1211 in the present embodiment. For the bend angles β1 to β5 of the respective bent portions 11A, optimum values can be selected according to the shape of the display apparatus 100, etc.

With the above structure, the wiring resistance which, in the prior art, has a large gap across the border between the upper and lower driving electrode groups, as shown in FIG. 16, has been improved so that the wiring resistance is substantially constant across the entire screen. The present embodiment thus solves the problem that the display quality degrades due to the border that becomes visible between the upper half, where display operation is controlled by the driving electrodes 11-1 to 11-5, and the lower half, where display operation is controlled by the driving electrodes 11-6 to 11-10. Furthermore, as the wiring resistances of all the driving electrodes have been made substantially the same, the driving of the liquid crystal across the entire screen can be controlled using the same conditions. This eliminates the unevenness of display, and serves to prevent the display quality from being impaired by display unevenness.

According to the second embodiment of the present invention, the wiring lines 14-1 are made successively longer by displacing the transfer-connection positions T1 to T5, to which the ends of the respective driving electrodes 11-1 to 11-5 are connected, in the direction opposite to the driver IC 7 relative to the extended lines P of the driving electrodes 11-1 to 11-5. The wiring resistances of the first wiring lines 14-1 can thus be made successively higher. Further, the wiring lines 14-2 are made successively shorter by displacing the transfer-connection positions T6 to T10, to which the ends of the respective driving electrodes 11-6 to 11-10 are connected, in the direction toward the driver IC 7 relative to the extended lines P of the driving electrodes 11-6 to 11-10. The wiring resistances of the second wiring lines 14-2 can thus be made successively lower. With this structure, the wiring resistances of the wiring lines for the driving electrodes 11 can be made substantially the same even if the number, N, of driving electrodes 11 increases.

In this way, the resistance difference between the plurality of wiring lines can be eliminated, and thus the unevenness of display due to the wiring resistance difference can be prevented and crosstalk reduced, achieving an improvement in display quality. Further, by ensuring the conduction areas for the transfer connections, the reliability of the transfer connections improves. Furthermore, since the wiring areas for the first wiring lines 14-1 and/or the second wiring lines 14-2 are reduced and are made effective use of, the peripheral portion area and/or the overall size of the display apparatus can be reduced.

It should also be noted here that the structures shown in FIGS. 6 to 8 as modified examples of the first embodiment can also be employed in the second embodiment of the present invention.

While the above embodiments have each been described by dealing with a display apparatus having 10 driving electrodes, it will be appreciated that the number of driving electrodes shown is only one example and should not be limited to any specific number. The control can be performed in the same manner as described above by increasing or decreasing the number of driving electrodes according to the shape and/or size of the display apparatus. For example, in the case of a display apparatus having 100 driving electrodes, the end portions of the first 50 driving electrodes 11-1 to 11-50 are bent so as to shift the transfer-connection positions T1 to T50 in the direction away from the driver IC relative to the extended lines P of the driving electrodes, while the end portions of the remaining 50 driving electrodes 11-51 to 11-100 are bent so as to shift the transfer-connection positions T51 to T100 in the direction toward the driver IC relative to the extended lines P of the driving electrodes.

The display apparatuses 1 and 100 of the present invention have each been described by taking a transflective liquid crystal display apparatus as an example; in this type of liquid crystal display, a backlight device (not shown) is provided as a light source behind the lower substrate 2 (i.e., on the side thereof opposite from the liquid crystal 6), and when the display is operated in the transmissive mode, light from, the backlight device is passed through windows in a transflective film (not shown) and images are displayed by turning the liquid crystal on and off. On the other hand, when the display is operated in the reflective mode, external light is introduced from the upper substrate 3 side and reflected by the transflective film patterned on the liquid crystal 6 side of the lower substrate 2, and images are produced by turning the liquid crystal on and off to transmit or block the reflected light. The present invention can also be applied to reflective display apparatuses and transmissive display apparatuses; in such cases also, the same effects as those described above can be obtained.

According to the display apparatus of the present invention, by adjusting the resistance difference between the plurality of wiring lines, the unevenness of display due to the wiring resistance difference can be prevented and/or the crosstalk can be reduced, achieving an improvement in display quality. The present invention is particularly advantageous for application to a display apparatus or the like when it is desired to reduce the area outside the display area as much as possible and thereby reduce the peripheral portion area and/or the overall size of the display apparatus.

The invention claimed is:

1. A display apparatus comprising:
a first substrate having a first driving electrode and a second driving electrode;
a second substrate having a first wiring line and a second wiring line; and
a seal member for facing said first substrate and said second substrate each other with a gap filled with an electro-optical conversion material therein, and said seal member has electrical conductivity, wherein
said first and second driving electrodes are formed substantially straight across a display area,
said first driving electrode having a first bent portion which is located outside said display area,
said first driving electrode is electrically connected at a first transfer-connection position to said first wiring line,
said second driving electrode having a second bent portion which is located outside said display area,
said second driving electrode is electrically connected at a second transfer-connection position to said second wiring line, and
said first transfer-connection position is from an extended line of said first driving electrode in a first direction by said first bent portion and said second transfer-connection position is offset from an extended line of said second driving electrode in a second direction, which is different from said first direction, by said second bent portion so as to adjust the wiring resistance of said first and second wiring lines.

2. The display apparatus according to claim 1, wherein
said first wiring line is located along a first side of said second substrate outside of said display area,
said second wiring line is located along a second side of said second substrate outside of said display area, said second side being opposite to said first side,
said first transfer-connection position is located in a portion along said first side, and
said second transfer-connection position is located in a portion along said second side.

3. The display apparatus according to claim 2, wherein
said second substrate has an extended portion extending beyond said first substrate,
said first wiring line and said second wiring line are routed from said extended portion into an area where said electro-optical conversion material is placed,
said first driving electrode located nearer to said extended portion is electrically connected at said first transfer-connection position to said first wiring line, and
said first transfer-connection position is located offset from the extended line of said first driving electrode in a direction away from said extended portion.

4. The display apparatus according to claim 2, wherein
said second substrate has an extended portion extending beyond said first substrate,
said first wiring line and said second wiring line are routed from said extended portion into an area where said electro-optical conversion material is placed,
said second driving electrode located farther from said extended portion is electrically connected at said second transfer-connection position to said second wiring line, and
said second transfer-connection position is located offset from the extended line of said second driving electrode in a direction toward said extended portion.

5. The display apparatus according to claim 1, wherein
the wiring resistance per unit length of said first or said second driving electrode is smaller in a portion thereof extending from said display area to said first or said second transfer-connection position than in a portion thereof located within said display area.

6. The display apparatus according to claim 1, wherein
electrode width of said first or said second driving electrode is smaller in a portion thereof extending from said display area to said first or said second transfer-connection position than electrode width thereof located within said display area.

7. The display apparatus according to claim 1, wherein
said seal member contains electrically conductive particles.

8. A display apparatus comprising:
a first substrate having a first driving electrode group containing a plurality of driving electrodes and a second driving electrode group containing a plurality of driving electrodes;
a second substrate having a first wiring line group containing a plurality of wiring lines and a second wiring line group containing a plurality of wiring lines; and
a seal member for facing said first substrate and said second substrate each other with a gap filled with an electro-optical conversion material therein, and said seal member has electrical conductivity, wherein
said plurality of driving electrodes contained in said first driving electrode group are electrically connected at a plurality of first transfer-connection positions to respective ones of said plurality of wiring lines contained in said first wiring line group,
said plurality of driving electrodes contained in said second driving electrode group are electrically connected at a plurality of second transfer-connection positions to respective ones of said plurality of wiring lines contained in said second wiring line group, and
said plurality of driving electrodes contained in said first driving electrode group respectively having bent portions, by which said transfer-connection positions are respectively offset in a first direction from extended lines of said plurality of driving electrodes contained in said first driving electrode group and said plurality of driving electrodes contained in said second driving electrode group respectively having bent portions, by which said transfer-connection positions are respectively offset in a second direction, which is different from said first direction, from extended lines of said plurality of driving electrodes contained in said second driving electrode group so that the wiring resistance of said plurality of wiring lines contained in said first wiring line group and the wiring resistance of said plurality of wiring lines contained in said second wiring line group changes at a substantially constant rate.

9. The display apparatus according to claim 8, wherein
the bent portions of said plurality of driving electrodes contained in said first driving electrode group have substantially the same bend angle, and
the bent portions of said plurality of driving electrodes contained in said second driving electrode group have substantially the same bend angle.

10. A display apparatus comprising:
a first substrate having a first driving electrode group containing a plurality of driving electrodes and a second driving electrode group containing a plurality of driving electrodes;
a second substrate having a first wiring line group containing a plurality of wiring lines and a second wiring line group containing a plurality of wiring lines; and a seal member for facing said first substrate and said second substrate each other with a gap filled with an electro-optical conversion material therein, and said seal member has electrical conductivity, wherein said plurality of driving electrodes contained in said first driving electrode group are electrically connected at a plurality of first transfer-connection positions to respective ones of said plurality of wiring lines contained in said first wiring line group, said plurality of driving electrodes contained in said second driving electrode group are electrically connected at a plurality of second transfer-connection positions to respective ones of said plurality of wiring lines contained in said second wiring line group, and said plurality of driving electrodes contained in said first driving electrode group respectively having bent portions, by which said transfer-connection positions are respectively offset in a first direction from extended lines of said plurality of driving electrodes contained in said first driving electrode group and said plurality of driving electrodes contained in said second driving electrode group respectively having bent portions, by which said transfer-connection positions are respectively offset in a second direction, which is different from said first direction, from extended lines of said plurality of driving electrodes contained in said second driving electrode group so that the wiring resistance of said plurality of wiring lines contained in said first wiring line group and the wiring resistance of said plurality of wiring lines contained in said second wiring line group have substantially the same resistance value.

11. The display apparatus according to claim 10, wherein the bent portions of said plurality of driving electrodes contained in said first driving electrode group have respectively different bend angles, and the bent portions of said plurality of driving electrodes contained in said second driving electrode group have respectively different bend angles.

* * * * *